United States Patent
Rehnberg et al.

(12)

(10) Patent No.: US 6,211,329 B1
(45) Date of Patent: Apr. 3, 2001

(54) PROCESS FOR PREPARATION OF A DENDRITIC POLYOL

(75) Inventors: Nicola Rehnberg, Perstorp; Bo Pettersson, Lund; Ulf Annby, Lund; Mats Malmberg, Lund, all of (SE)

(73) Assignee: Perstorp AB, Perstorp (SE)

( * ) Notice: Subject to any disclaimer, the term of this patent is extended or adjusted under 35 U.S.C. 154(b) by 0 days.

(21) Appl. No.: 09/446,883

(22) PCT Filed: May 28, 1998

(86) PCT No.: PCT/SE98/01012

§ 371 Date: Feb. 29, 2000

§ 102(e) Date: Feb. 29, 2000

(87) PCT Pub. No.: WO99/00439

PCT Pub. Date: Jan. 7, 1999

(30) Foreign Application Priority Data

Jun. 26, 1997 (SE) .................................................. 9702443

(51) Int. Cl.⁷ ....................................................... C08G 4/00
(52) U.S. Cl. .......................... 528/220; 528/230; 528/247; 528/272; 525/437; 525/441
(58) Field of Search ................................... 528/220, 230, 528/247, 272; 525/437, 441

(56) References Cited

U.S. PATENT DOCUMENTS

| | | | |
|---|---|---|---|
| 4,410,688 | | 10/1983 | Denkewalter et al. . |
| 5,418,301 | * | 5/1995 | Hult et al. ............................. 525/437 |
| 6,093,777 | * | 7/2000 | Sorensen et al. ..................... 525/438 |

FOREIGN PATENT DOCUMENTS

| | | |
|---|---|---|
| 9317060 | 9/1993 | (WO) . |
| 9612754 | 5/1996 | (WO) . |

OTHER PUBLICATIONS

J. Am. Chem. Soc., vol. 118, 1996, pp. 6388–6395.

* cited by examiner

*Primary Examiner*—Duc Troung
(74) *Attorney, Agent, or Firm*—Stevens, Davis, Miller & Mosher, L.L.P.

(57) ABSTRACT

A process for synthesis of a polymeric polyalcohol substantially and preferably built up form polyester units and composed of a monomeric or polymeric initiator molecule to which at least one dentritic branch (dendron) consisting of a number of branching generations is added. The branching generations comprise a polymericor monomeric branching chain extender having three reactive functions of which two are hydroxyl groups. The two hydroxyl groups of the ranching chain extender is acetal protected by reaction between said two hydroxyl groups and an acetal-forming carbonyl compound, preferably an aldehyde. The acetal protected branching chain extender is then employed for addition to the initiator molecule of a first branching generation followed by an optional deprotection of the hydroxyl groups by decomposition of acetals and for addition in repeated steps of further branching generations. Additions of branching generations individually employ an acetal protected branching chain extender synthesized from the same or a different branching chain extender and/or acetal-forming carbonyl compound and addition of a branching generation is optionally followed by addition of a spacing generation.

62 Claims, No Drawings

PROCESS FOR PREPARATION OF A DENDRITIC POLYOL

The present invention relates to a process for synthesis of a polymeric polyalcohol (polyol) substantially and preferably built up from polyester units, optionally in combination with ether, polyether, amide or polyamide units. The polymeric polyalcohol is a hyperbranched dendritic polyester alcohol having reactive or protected terminal hydroxyl groups, which polyester alcohol is synthesized by repeated addition of acetal protected chain extenders to an initiator molecule, whereby each addition is followed by deprotection in the form of acetal decomposition and product recovery. The initiator molecule has n reactive unprotected groups to which n branches each consisting of g branching generations are added, whereby n and g are integers and at least 1. The branching generations comprises at least one polymeric or monomeric branching chain extender having three reactive groups of which two are acetal protected hydroxyl groups.

Compounds with a highly branched, treelike, molecular structure have been known for a long time. Literature discussing various hyperbranched and dendritic molecules and macromolecule include:

"Polybenzyl Type Polymers" by Howard C. Haas et al published in *J. Polymer Sci.* col XV (1995) pp. 503–515, wherein nonrandomly substituted highly branched benzyl type polymers are synthesized and analysed.

"Strukturuntersuchungen an Sternmolekülen mit Glykogen als Kern" by Walther Burchard et al published in *Makromolekulare Chemie* 150 (1971) pp. 63–71, wherein the structure of molecules having treelike amylose chains and a glycogen core are disclosed.

"Statistical Mechanism of Random Coil Networks" and "Elasticity and Chain Dimensions in Gaussian Networks", by William W. Graessley published in pp 865–868, wherein molecules comprising tri and tetrafunctional central cores (initiators) and concentrically treelike (dendritic) branches are disclosed. The term micronetworks is introduced to describe these molecules.

"Static and Dynamic Scattering Behaviour of Regularly Branched Chains: A Model of Soft-Sphere Microgels" by Walther Burchard et al published in *J. Polymer Sci. Polym. Phys. Ed.* vol 20 (1982) pp. 157–171, wherein is disclosed, among other models, the theory behind a molecular model comprising a trifunctional core being symmetrically branched whereby continued branch replication yields increased branch multiplicity and an increased number of terminal groups.

The birth of dendritic or "cascade" chemistry is formally realized in the first reported preparation, separation and characterization of structures with branched topologies obtained via an iterative methodology "'Cascade'—and 'Nonskid-Chain-Like' Synthesis of Molecular Cavity Topologies"—*Synthesis* 1978, pp. 155–158, E. Buhleier et al.

Structures such as starbranched, dense starbranched, dendrimers and hyperbranched dendritic molecules and macromolecules are from these and a large number of similar works published in the 1950's, 1960's and especially in the 1970's easily visualized but not easily synthesized.

Various hyperbranched and dendritic materials have during the last one or two decades attracted general attention. Patents, patent applications and other works issued or published during the last decades are summarized by for instance H. Galina et al in *Polymery;* English translation in *Int. Polym. Sci. Tech.* 1995, 22, 70.

Hyperbranched dendritic macromolecules, including dendrimers, can generally be described as three dimensional highly branched molecules having a treelike structure. Dendrimers are highly symmetric, while similar macromolecules designated as hyperbranched and/or dendritic may to a certain degree hold an asymmetry, yet maintaining the highly branched treelike structure. Dendrimers can be said to be monodisperse-determined molecular weight $(M_w)$/nominal molecular weight $(M_n)$=1—or substantially monodisperse $(M_w/M_n \approx 1)$ hyperbranched macromolecules. Hyperbranched and dendritic macromolecules normally consist of an initiator or nucleus having one or more reactive sites and a number of branching layers and optionally a layer of chain terminating molecules. Continued replication of branching layers normally yields increased branch multiplicity and, where applicable or desired, increased number of terminal groups. The layers are usually called generations and the branches dendrons, which are designations hereinafter used.

Synthesis of perfect dendritic material, that is substantially monodisperse molecules comprising symmetrical treelike (dendritic) branches which optionally emanate symmetrically as well as concentrically from a core or initiator molecule, is a challenging task as high yield and selectivity is required in all reaction steps. Various processes have been suggested for dendritic, near dendritic and perfect dendritic products, but complex and inefficient synthesis is still an obstacle to technical and commercial use of monodisperse dendritic products. Most disclosed processes yield either polydisperse and/or too expensive products. A number of patents and patent applications disclosing various hyperbranched and/or dendritic macromolecules and processes for synthesis thereof have for various types of products been issued or published and include EP 0 115 771, SE 468 771, WO 93/18075, EP 0 575 596, SE 503 342 and U.S. Pat. No. 5,561,214.

EP 0 115 771 claims a dense star polymer having at least three symmetrical core branches, each core branch having at least one terminal group, and a ratio terminal groups to core branches being greater than 2:1. The properties of claimed polymer is specified through a comparative relation to an unspecified and allegedly known star polymer. Claim 1 can due to inoperable teaching of terminal groups and unspecified comparison not be interpreted. EP 0 115 771 also relates to a process, which process substantially also is disclosed in U.S. Pat. No. 4,410,688, for synthesis of a symmetrical dense star polymer. The process teaches a repeated and alternately addition of alkyl acrylate and alkylene diamine to a core consisting of ammonia.

SE 468 771 discloses a hyperbranched dendritic macromolecule substantially built up from polyester units and a process for synthesis of said macromolecule. The macromolecule is composed of an initiator, having at least one hydroxyl group, to which initiator at least one branching generation comprising at least one chain extender, having at least one carboxyl group and at least two hydroxyl groups, is added. The macromolecule is optionally chain terminated. The process for synthesis of said macromolecule teaches a co-esterification of the initiator and the chain extender, optionally followed by a chain termination. The process yield inexpensive polydisperse hyperbranched dendritic macromolecules.

WO 93/18075 teaches a hyperbranched polymer having at least six terminal hydroxyl or carboxyl groups and a process for its synthesis. The hyperbranched polymer is synthesized by repeated and alternately addition of a compound having at least one anhydride group followed by a compound having at least one epoxide group to a nucleus having at least one hydroxyl group.

EP 0 575 596 discloses a dendritic macromolecule comprising a core having 1–10 functional groups and branches synthesized from vinyl cyanide units as well as a process for synthesis thereof. The process involves three repeated steps beginning with a reaction between the core and monomeric vinyl cyanide units followed by reduction of incorporated nitrile groups to amine groups. In a third step said amine groups are reacted with monomeric vinyl cyanide units.

SE 502 342 discloses a hyperbranched dendritic macromolecule of polyester type and a process for synthesis of said macromolecule. The macromolecule is substantially composed of a nucleus, having at least one epoxide group, to which nucleus at least one branching generation comprising at least one chain extender, having at least three reactive functions of which at least one is a carboxyl or epoxide group and at least one is a hydroxyl group, is added. The macromolecule is optionally chain terminated. The process teaches self condensation of the chain extender molecules yielding a dendron (a core branch), which dendron in a second step is added to the nucleus. The process also comprises an optionally further chain extension by addition of spacing or branching chain extenders and/or an optional chain termination. The process yields inexpensive polydisperse hyperbranched dendritic macromolecules.

U.S. Pat. No. 5,561,214 relates to highly asymmetrical hyperbranched polydisperse polyaspartate esters and a process for their synthesis. The process comprises self condensation, via transesterification, of at least a portion of the hydroxyl or ester groups of a hydroxyaspartate.

Recent developments in the synthesis and characterization of dendritic molecules are disclosed in for instance "Synthesis, Characterization, and $^1$H-NMR Self-Diffusion Studies of Dendritic Aliphatic Polyesters Based on 2,2-Bis (hydroxymethyl)propionic acid and 1,1,1-Tris (hydroxyphenyl)ethane" by Henrik Ihre et al published in *J. Am. Chem. Soc.* vol 118 (1996) pp. 6388–6395, wherein dendritic polyesters having one, tow, three and four generations are synthesized and characterized. The dendrimers are synthesized in the convergent fashion, whereby dendrons (core branches) first are synthesized from acylated 2,2-Bis (hydroxymethyl)propanoic acid and then coupled to a polyfunctional phenolic core molecule. A further disclosure of recent developments is "Hyperbranched Aliphatic Polyesters—Synthesis, Characterization and Applications" by Eva Malmström, *Royal Institute of Technology*, Stockholm 1996, wherein hyperbranched dendritic polyesters of the type disclosed in SE 468 771 are studied and discussed.

Hyperbranched dendritic, including dendrimers, polyalcohols substantially built up from polyester units give, due to the symmetrical or near symmetrical highly branched structure, in comparison to ordinary polyalcohols and randomly branched, polydisperse, polyester polyalcohols great advantages. Said hyperbranched dendritic polyalcohols exhibit a low polydispersity and can, due to the structure, be formulated to give a very high molecular weight yet exhibiting a very low viscosity. Hyperbranched dendritic, including dendrimers, polyester polyalcohols can advantageously be used for further processing, such as chain termination and/or functionalization, thus yielding dendritic products having for instance a fatty acid chain termination, alkenyl groups, such as allyl, vinyl or acryl, primary or secondary epoxide groups, isocyanate groups and/or undergo similar conversion of or reaction involving the hydroxyl groups of said polyalcohol.

The inexpensive, readily available and easy to handle material used in the process of the present invention provide quite unexpectedly possibility to formulate an easy, reliable and reproducible process for the synthesis of monodisperse or substantially monodisperse polyester alcohols, that is dendritic polyesters having terminal unprotected or protected hydroxyl groups. The process of the present invention is easily and conveniently adjusted to desired processing conditions and desired final structure and properties of yielded dendritic polyalcohol.

The present invention relates to a process for synthesis of a polymeric polyalcohol having reactive or protected terminal hydroxyl groups, which polymeric polyalcohol is composed of a monomeric or polymeric initiator molecule having n reactive and/or unprotected groups (A), to which n dendritic branches each consisting of g branching generations are added, whereby n and g are integers and at least 1. The branching generations comprise at lease one polymeric or monomeric branching chain extender having three functional groups of which two are reactive hydroxyl groups (B) and one is a group (C) reactive to said group (A) and/or said hydroxyl group (B). The two hydroxyl groups of the branching chain extender are acetal protected during addition. A branching generation is, furthermore, optionally followed by at least one spacing generation comprising at least one spacing chain extender having two functional groups.

Acetal is herein defined in accordance with the definition supplied by *Römpps Chemie-Lexikon,* 8th edition, 1979, volume 1 page 36:

Acetale. Bez. für org. Dialkoxyverb. (Alkyldiether) der allg. Formel RCH(OR$^1$)(OR$^2$) die Formal entstehen wenn *Aldehyde, *Ketone od. andere Carbonylverb. mit *Alkoholen im Molverhältnis 1:2 unter Wasserabspaltung (z.B. unter dem Einfl. von sauren Katalysatoren) aufeinander einwirken, . . . "

The above is translated:

Acetals. Designation for organic dialkoxy compounds (alkyl diethers) of the general formula RCH(OR$^1$) (OR$^2$), the formal is obtained when *aldehydes, *ketones or other carbonyl compounds under water release (e.g. under influence of acidic catalysts) are reacted with *alcohols at a molar ratio 1:2, . . .

Acetals (alkyl diethers) are accordingly formed when carbonyl compounds, such as aldehydes and ketones, are reacted with alcohols at a molar ratio hydroxyl groups to carbonyl groups of 2:1. Acetals of formaldehyde are more specifically designated as formals, acetals of butyric aldehyde as butyrals and acetals of ketones, such as acetone acetals, as ketals.

Cyclic acetals such as 1,3-dioxanes or 1,3-dioxolanes are yielded together with water from a reaction between an alcohol, having at least two hydroxyl groups and a carbonyl compound having a carbonyl group and can be exemplified by below simplified reaction scheme.

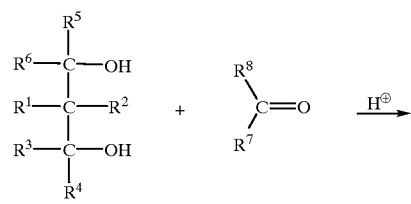

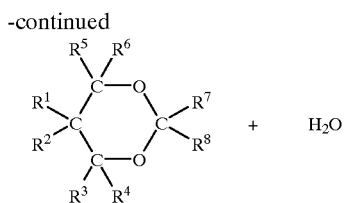 + H$_2$O

The process of the present invention employs a monomeric or polymeric branching chain extender wherein said two hydroxyl groups (B) are two acetal protected hydroxyl groups (B'). Acetal protection—Step (i)—is obtained by reaction between said two hydroxyl groups (B) and an acetalforming carbonyl compound, preferably an aldehyde. A first branching generation—Step (ii)—is added to the initiator molecule by reaction between said group (A) and said group (C) at a molar ratio groups (A) to groups (C) of 1 to at least 1, whereby a polymeric polyalcohol having acetal protected hydroxyl groups (B') and n dendritic branches comprising one generation is yielded. The acetal protected hydroxyl groups (B') are optionally deprotected by acetal decomposition, whereby a polymeric polyalcohol having reactive hydroxyl groups (B) is yielded. Further branching generations—Step (iii)—are added, in g-1 repeated steps, by reaction between said reactive hydroxyl groups (B) and said group (C) at a molar ratio reactive hydroxyl groups (B) to reactive groups (C) of 1 to at least 1. A polymeric polyalcohol having acetal protected hydroxyl groups (B') and n dendritic branches comprising two or more generations is thus yielded and the acetal protected hydroxyl groups (B') are optionally deprotected by acetal decomposition, whereby a polymeric polyalcohol having reactive hydroxyl groups (B) is yielded. Step (ii) and/or each repetition of Step (iii) is optionally and individually followed by a partial protection, such as acetal, ketal and/or ester protection, of available reactive hydroxyl groups (B), thus yielding a polymeric polyalcohol having a reduced number of reactive hydroxyl groups (B), whereby the number of reactive hydroxyl groups (B) in said Step (iii) is at least one. An added branching chain extender can optionally be followed—Step (iv)—by addition of a spacing chain extender, which addition employs a spacing chain extender having one protected hydroxyl group (B") and one group (D) reactive to a hydroxyl group, thus yielding after deprotection of the protected hydroxyl groups (B"), a polymeric polyalcohol having reactive hydroxyl groups (B) utilized in Step (iii) or a repeated Step (iii) and n dendritic branches comprising one or more branching generations and at least one spacing partial generation.

The polymeric polyalcohol is preferably built up from polyester units, optionally in combination with ether, polyether, amide and/or polyamide units and the reactive groups are in preferred embodiments accordingly selected to yield said units. Reactive or unprotected groups (A) are in preferred embodiments hydroxyl, epoxide, carboxyl or anhydride groups and reactive groups (C) and reactive groups (D) are individually the same or different and are preferably epoxide, carboxyl or anhydride groups. Said reactive groups are most preferably hydroxyl groups (A) and carboxyl groups (C) and (D).

Each additions of a branching generation—Step (ii)—and/or Steps (iii)—can according to various embodiments individually employ an acetal protected branching chain extender being a reaction product of the same or a different branching chain extender an/or the same or a difference acetalforming carbonyl compound. The acetal protected branching chain extender—Step (i)—can be instance be prefabricated or be yielded during for instance synthesis or recovery of a synthesized polyalcohol or hydroxyfunctional carboxylic acid or be manufactured in a separate process.

The integer value of n is in preferred embodiments between 1 and 20, preferably between 2 and 12 and most preferably between 2 and 8 and the integer value of g is in likewise preferred embodiments between 1 and 50, preferably between 2 and 20 and most preferably between 2 and 8.

The polymeric polyalcohol yielded from the process according to the present invention has in its preferred embodiments n identical and/or symmetrical dendritic branches, whereby n is an integer and at least 2. Continued branching chain extension yields in these embodiments polymeric polyalcohols having increased branching density and increased number of reactive hydroxyl groups (B) or acetal protected hydroxyl groups (B').

Addition of branching and optional spacing generations are in preferred embodiments performed at a temperature of −30–150° C., such as 10–80° C. or 10–50° C.

Especially preferred embodiments of the present invention employ benzylidene protected branching chain extenders, such as benzylidene protected dihydroxy monocarboxylic acid. The acetalforming carbonyl compound is in these embodiments an aldehyde of formula

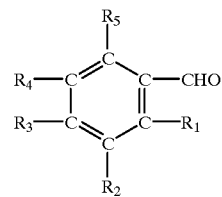

wherein $R_1$, $R_2$, $R_3$, $R_4$ and $R_5$ independently is hydrogen alkyl, alkoxy, halo, haloalkyl or haloalkoxy. The aldehyde is preferably a benzaldehyde and/or a substituted benzaldehyde, such as an alkylbenzaldehyde, an alkoxybenzaldehyde, a halobenzaldehyde, a haloalkylbenzaldehyde or a haloalkoxybenzaldehyde. Deprotection of the two acetal protected hydroxyl groups (B') of the monomeric or polymeric branching chain extender is advantageously in these embodiments performed by hydrogenolytic decomposition of the acetal, preferably in the presence of a solvent or a solvent combination selected to assure a homogeneous system throughout the hydrogenolysis. Suitable solvents are for instance water, methanol, ethanol, propanol, glycols, toluene, dimethoxyethane, diethyl ether, dipropylether, ethoxyethanol and acetonitrile. Hydrogenolytic decomposition are, furthermore, preferably performed in the presence of a catalyst, such as a metallic catalyst comprising rhodium, ruthenium, platinum, palladium and/or an oxide thereof. The metal or metal oxide catalyst suitably comprises a carrier comprising or consisting of for instance activated carbon, a ceramic material and/or a catalytically inert metal oxide such as aluminium oxide. Acetals of benzaldehydes normally do not require acidic hydrolysis to conveniently decompose yielding deprotected hydroxyl groups and benzaldehyde or a benzaldehyde derivative. It is, however, possible to decompose the acetal by acidic hydrolysis or by a combination of acidic hydrolysis and said hydrogenolysis under said conditions.

Hydrogenolysis of acetals of benzaldehyde and substituted benzaldehydes can be exemplified and explained by below simplified reaction schedule

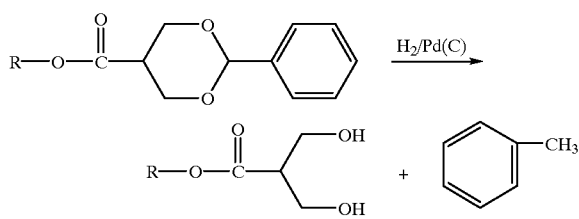

wherein R is for instance an alkyl radical of any configuration, $H_2$ is molecular hydrogen and Pd(C) designates a palladium catalyst on activated carbon.

Further embodiments of the present invention employ acetal protected branching chain extenders wherein the acetalforming carbonyl compound is an aldehyde or ketone selected from the group consisting of formaldehyde, acetaldehyde, butyraldehyde, isobutyraldehyde, acetone, cyclohexanone and similar carbonyl compounds.

Deprotection of the two acetal protected hydroxyl groups of the monomeric or polymeric branching chain extender is, in embodiments including acetals such as formals and butyrals (acetals of formaldehyde and butyric aldehyde), suitably performed by solvolytic (water/methanol etc.) decomposition under acidic conditions of the acetal or as disclosed above in combination with hydrogenolytic decomposition under said conditions.

The branching chain extender used to produce the acetal protected branching chain extender is in the most preferred embodiments of the present invention a dihydroxyfunctional monocarboxylic acid, such as 2,2-bis(hydroxymethyl)-propanoic acid, 2,2-bis(hydroxymethyl)butanoic acid, 2,2-bis(hydroxymethyl)pentanoic acid or 2,3-dihydroxypropanoic acid. Adducts between said dihydroxyfunctional monocarboxylic acid and an alkylene oxide, such as ethylene oxide, propylene oxide, butylene oxide and/or phenylethylene oxide, are also advantageously used to produce said acetal protected branching chain extender. Further branching chain extenders are various compounds having two hydroxyl groups, possible to acetal protect, and for instance one carboxyl, anhydride, hydroxyl or epoxide group and can be exemplified by glycerol, trimethylolethane and trimethylolpropane, which are used to branch for instance an initiator molecule having one or more reactive carboxyl and/or anhydride groups.

The initiator molecule is preferably selected from the group consisting of aliphatic, cycloaliphatic or aromatic mono, di, tri or polyalcohols or hydroxyfunctional carboxylic acids and adducts thereof, such as hydroxysubstituted allyl ethers and alkoxylates, or from the group consisting of glycidyl ethers, glycidyl esters, epoxides of unsaturated carboxylic acids and triglycerides, aliphatic, cycloaliphatic or aromatic epoxy polymers and epoxidized polyolefins.

Hydroxyfunctional initiator molecules are suitable exemplified by the alcohols, such as 4-hydroxymethyl-1,2-dioxolane, 5-methyl-5-hydroxymethyl-1,3-dioxane, 5-ethyl-5-hydroxymethyl-1,3-dioxane, ethylene glycol, diethylene glycol, triethylene glycol, polyethylene glycol, propylene glycol, dipropylene glycol, tripropylene glycol, polypropylene glycol, neopentyl glycol, dimethylolpropane, 5,5-dihydroxymethyl-1,3-dioxane, glycerol, trimethylolethane, trimethylolpropane, pentaerythritol, ditrimethylolethane, ditrimethylolpropane, anhydroennea-hepitol, dipentaerythritol, sorbitol and mannitol; hydroxysubstituted allyl ethers, such as glycerol monoallyl ether, glycerol diallyl ether, trimethylolpropane monoallyl ether, trimethylolpropane diallyl ether, pentaerythritol monoallyl ether, pentaerythritol diallyl ether or pentaerythritol triallyl ether; and alkoxylates of said alcohols and said hydroxysubstituted allyl ethers. Alkoxylates are adducts between an alcohol or a hydroxyfunctional derivative thereof and an alkylene oxide, such as ethylene oxide, propylene oxide, butylene oxide and/or phenylethylene oxide, and can be exemplified by glycerol propoxylates, trimethylolethane ethoxylates, trimethylolethane propoxylates, trimethylolpropane othoxylates, trimethylolpropane propoxylates, pentaerythritol ethoxylates and pentaerythritol propoxylate as well as ethoxylates and/or propoxylates of hydroxysubstituted allyl ethers, such as trimethylolpropane diallyl ether.

Suitable and in certain embodiments preferred initiator molecules include phenolic alcohols, such as xylylene alcohols, hydroxyphenylalkanes and hydroxybenzenes, such as xylylene glycol, 1,1,1-(trihydroxyphenyl)ethane, dihydroxybenzene and trihydroxybenzene.

Initiator molecules, such as 1,3-dioxane and 1,3-dioxolane alcohols, which per se are acetals, having two acetal protected hydroxyl groups (B'), can after completed addition of branching and optional spacing chain extenders be deprotected yielding hydroxyl groups (B) according to methods disclosed in for instance "Protective Groups in Organic Synthesis" by Theodora W. Greene and Peter G. M. Wuts, Chapter 2 "Protection for the Hydroxyl Group"—John Wiley & Sons Inc., New York 1991.

Epoxyfunctional compounds can be exemplified by glycidyl ethers, such as 3-allyloxy-1,2-epoxypropane, 1,2-epoxy-3-epoxy-3-phenoxypropane and 1-glycidyloxy-2-ethylhexane; glycidyl ethers of phenols or reaction products thereof, such as condensation products between at least one phenol and at least one aldehyde or ketone; mono, di or triglycidyl substituted isocyanurates; and glycidyl ester, such as the Cardura® compounds, which compounds are glycidyl esters of a highly branched saturated synthetic monocarboxylic acid named Versatic® acid (Cardura and Versatic are trademarks of Shell Chemicals).

The initiator molecule is in the most preferred embodiments of the present invention a hydroxyfunctional compound selected from the group consisting of 5-ethyl-5-hydroxymethyl-1,3-dioxane, 5,5-dihydroxymethyl-1,3-dioxane, neopentyl glycol, trimethylolethane, trimethylolpropane, ditrimethylolpropane, pentaerythritol, dipentaerythritol, trimethylolpropane triethoxylate, trimethylolpropane tripropoxylate, pentaerythritol triethoxylate, pentaerythritol pentaethoxylate, O,O',O",O'"-tetrakis(3-hydroxypropyl)pentaerythritol, trimethylolpropane monoallyl ether or trimethylolpropane diallyl ether.

Further embodiments of the present invention employ, as initiator molecule, a compound having at least one reactive hydroxyl or epoxide group and at least one, optionally protected, group, such as a carboxylic group. Such a compound can be exemplified by hydroxyfunctional carboxylic acids and alkoxylates or hydroxysubstituted allyl ethers of said hydroxyfunctional carboxylic acids, which adducts have at least one reactive hydroxyl group and at least one protected carboxyl group. Said alkoxylates are suitably reaction products with one or more alkylene oxides, such as ethylene oxide, propylene oxide, butylene oxide and/or phenylethylene oxide. The optionally protected carboxyl group is suitably ester protected, whereby the initiator molecule preferably is an alkyl, aryl or alkaryl ester, such as an allyl or a benzyl ester of said hydroxyfunctional carboxylic acids or said alkoxylates. The hydroxyfunctional carboxylic acid is preferably selected from the group consisting of 2,2-bis(hydroxymethyl)propanoic acid, 2,2-bis (hydroxymethyl butanoic acid, 2,2-bis(hydroxymethyl)

pentanoic acid, 2,3-dihydroxypropanoic acid, hydroxypentanoic acid, hydroxypropanoic acid and 2,2-dimethyl-3-hydroxypropanoic acid. A protected carboxyl group can in these embodiments after addition of the desired branching and optional spacing generations, before, during or after the optional deprotection of the acetal protected hydroxyl groups (B') be deprotected, thus yielding a monocarboxyfunctional dendritic polyalcohol optionally having said acetal protected hydroxyl groups (B'). Suitable deprotection methods as well as alternative protection methods for carboxyl groups are disclosed in for instance "Protective Groups in Organic Synthesis" by Theordora W. Greene and Peter G. M. Wuts, Chapter 5 "Protection for the Carboxyl Group"—John Wiley & Sons Inc., New York 1991.

Above disclosed monocarboxyfunctional dendritic polyalcohol can be used for further reactions including addition to a molecule similar or equal to an initiator molecule, whereby said monocarboxyfunctional dendritic polyalcohol may constitute a core branch, a so called dendron, of a hyperbranched dendritic polyalcohol. These embodiments include that at least one monocarboxyfunctional dendritic polyalcohol having acetal protected hydroxyl groups (B') is added to an initiator molecule, having at least one reaction group (A), by reaction between its carboxyl group and said reactive group (A), whereby said reactive group (A) preferably is a hydroxyl or an epoxide group.

Certain embodiments of the present invention include addition of one or more optional spacing chain extenders, having one group reactive to hydroxyl groups and one protected hydroxyl group. A spacing chain extender is advantageously selected from the group consisting of monohydroxyfunctional monocarboxylic acids wherein the hydroxyl group is benzyl, silyl or pyranyl, such as p-methoxybenzyl, tert.butyldimethylsilyl or tetrahydropyranyl protected. The monohydroxyfunctional monocarboxylic acid is preferably hydroxypentanoic acid, hydroxypropanoic acid or 2,2-dimethyl-3-hydroxypropanoic acid. The protected hydroxyl group is deprotected after addition of said chain extender, whereby a hydroxyl group is yielded. Suitable deprotection methods as well as suitable alternative protection methods for hydroxyl groups are disclosed in for instance "Protective Groups in Organic Synthesis" by Theordora W. Green and Peter G. M. Wuts, Chapter 2 "Protection for the Hydroxyl Group"—John Wiley & Sons Inc., New York 1991.

The process of the present invention offers several major advantages of technical and commercial value. Most noted is the unexpectedly high reactivity of acetal protected acylating agents, such as benzylidene protected dihydroxyfunctional monocarboxylic acids, used according to the present invention as chain extenders and branching fragments in the construction of dendrimers and hyperbranched dendritic structures. Hydroxyfunctional carboxylic acids protected with other groups such as acetate or benzyl do not show the same high reactivity, thus construction of dendrimers from such molecules is highly complicated and of no practical importance. On the other hand, activated acetal protected hydroxyfunctional carboxylic acids may acylate hydroxyl functions even of a neopentyl structure. The high acylation ability of for instance acylation activate acetal protected hydroxyfunctional carboxylic acids, such as 2,2-bis (hydroxymethyl)propanoic acid, is dramatically shown by the high yields in the acylation of highly sterically crowded pentaerythritol (tetracoordinate and meopentylic) and by the high yield and complete acylation of dendrimers comprising for instance hydroxyfunctional carboxylic acids. Activation of carboxyfunctional chain extenders, as disclosed above, for acylation, that is addition to reactive groups (A) or (B), include activation as (a) anhydride, formed in situ, for instance aided by dicyclohexylcarbodiimide, or prefabricated; (b) acid chloride, for instance from oxalyl chloride (c) mixed anhydride, for instance carboxylic acid and trifluoroacetic anhydride, or (d) as imidazolide. The acylation is preferably performed in the presence of a solvent or solvent combination, such as methylene chloride, ethylene chloride, chloroform, pyridine, toluene, dimethoxyethane, diethyl ether, dipropyl ether, ethoxyethanol, nitrobenzene, chlorobenzene and/or acetonitrile. Esterification is advantageously performed in for instance dichloromethane through a dicyclohexylcarbodiimide coupling using 4-(dimethylamino)pyridinium-4-toluenesulphonate as catalyst.

The protective group for 1,3-diolgroupings is, in the most preferred embodiments of the invention, derived from an aromatic carbonyl compound such as benzaldehyde. This aromatic group makes it very easy to follow the reactions using convenient analytical techniques relying on UV absorption such as TLC or HPLC-UV. When possible from a chemical point of view the most preferred protection group is derived from the very inexpensive benzaldehyde allowing synthesis of dendrimers and hyperbranched dendritic structures at a modest cost. Protection derived from aromatic carbonyl compounds furthermore offer a great advantage over an aliphatic carbonyl derived protection in that besides solvolytic deprotection, extremely mild hydrogenolytic deprotection is possible. Decomposition of built up dendrimers and dendritic structures is thus highly unlikely and not observed during deprotection.

These and other objects and the attendant advantages will be more fully understood from the following detailed description, taken in conjunction with embodiment Examples 1–16. Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. Embodiment Examples 1, 2 and 3 disclose synthesis of acetal protected branching chain extenders employed in embodiments of the present invention and Examples 4 and 5 disclose synthesis of initiator molecules employed in embodiments of the present invention. Embodiment Examples 6–16 disclose synthesis of dendritic polyalcohols in accordance with preferred embodiments of the process of the present invention.

Example 1

Synthesis of benzylidene protected 2,2-bis (hydroxymethyl)-propanoic acid, that is the acetal of benzaldehyde and 2,2-bis(hydroxymethyl)propanoic acid, yielding 5-methyl-2-phenyl-1,3-dioxane-5-carboxylic acid.

Example 2

Synthesis of p-methoxybenzylidene protected 2,2-bis (hydroxymethyl)propanoic acid, that is the acetal of p-methoxybenzaldehyde and 2,2-bis(hydroxymethyl) propanoic acid, yielding 5-methyl-2-(p-methoxyphenyl)-1, 3-dioxane-5-carboxylic acid.

Example 3

Synthesis of the acetal (formal) of formaldehyde and 2,2-bis(hydroxymethyl)propanoic acid yielding 5-methyl-1, 3-dioxane-5-carboxylic acid.

Example 4

Synthesis of the initiator molecule O,O',O",O'"-tetrakis-(3-hydroxypropyl)pentaerythritol from pentaerythritol and 3-(benzyloxy)propyl p-toluenesulphonate.

Example 5

Synthesis of the initiator molecule allyl 2,2-bis (hydroxymethyl)propanoate from 2,2-bis(hydroxymethyl) propanoic acid and allyl bromide.

Example 6

Synthesis of a first generation dendritic polyalcohol from the initiator molecule pentaerythritol and the acetal obtained according to Example 1.

Example 7

Synthesis of a second generation dendritic polyalcohol from the first generation dendritic polyalcohol according to Example 6 and the acetal protected branching chain extender according to Example 1.

Example 8

Synthesis of a third generation dendritic polyalcohol from the second generation dendritic polyalcohol according to Example 7 and the acetal protected branching chain extender according to Example 1.

Example 9

Synthesis of a fourth generation dendritic polyalcohol from the third generation dendritic polyalcohol according to Example 8 and the acetal protected branching chain extender according to Example 1.

Example 10

Synthesis of a first generation dendritic polyalcohol from the initiator molecule obtained according to Example 4 and the acetal protected branching chain extender obtained according to Example 1.

Example 11

Synthesis of a second generation dendritic polyalcohol from the first generation dendritic polyalcohol according to Example 10 and the acetal protected branching chain extender according to Example 1.

Example 12

Synthesis of a third generation dendritic polyalcohol from the second generation dendritic polyalcohol according to Example 11 and the acetal protected branching chain extender according to Example 1.

Example 13

Synthesis of a fourth generation dendritic polyalcohol from the third generation dendritic polyalcohol according to Example 12 and the acetal protected branching chain extender according to Example 1.

Example 14

Synthesis of a first generation dendritic polyalcohol from the initiator molecule pentaerythritol and the acetal protected branching chain extender obtained according to Example 2.

Example 15

Synthesis of a first generation dendritic polyalcohol from the initiator molecule obtained according to Example 5 and the acetal protected branching chain extender obtained according to Example 1.

Example 16

Synthesis of a first generation dendritic polyalcohol from initiator molecule trimethylolpropane and the acetal (formal) protected branching chain extender obtained according to Example 3.

It was evidenced by $^1$H-NMR and $^{13}$C-NMR that products obtained in Examples 6–16 were polyester polyalcohols having dendritic branches (dendrons) of substantially identical and symmetrical structure and reported number of branching generations and terminal protected or reactive hydroxyl groups.

Example 1

Synthesis of the acetal protected branching chain extender 5-methyl-2-phenyl-1,3-dioxane-5-carboxylic acid from benzaldehyde and 2,2-bis(hydroxymethyl)-propanoic acid.

435 g of benzaldehyde and 550 g 2,2-bis(hydroxymethyl) propanoic acid were allowed to react in the presence of a small amount of p-toluenesulphonic acid. The reaction was under stirring carried out at room temperature followed by heating to 40° C. under a low pressure (15 mm Hg). Yielded product was then dissolved in a mixture of 8000 ml aqueous sodium hydrogencarbonate (0.54M) and 2500 ml of diethyl ether. The aqueous phase was now washed with diethyl ether and acidified with 800 g of tartaric acid. The precipitate was collected and washed with water. Obtained product was finally recrystallized from ethanol/ethyl acetate to yield 745 g of 5-methyl-2-phenyl-1,3-dioxane-5-carboxylic acid.

Example 2

Synthesis of the acetal protected branching chain extender 5-methyl-2-(p-methoxyphenyl)-1,3-dioxane-5-carboxylic acid from p-methoxybenzaldehyde and 2,2-bis (hydroxymethyl)propanoic acid.

Example 1 was repeated with the difference that 558 g of p-methoxybenzaldehyde was used instead of 435 g of benzaldehyde. 847 g of 5-methyl-2-(p-methoxyphenyl)-1,3-dioxane-5-carboxylic acid was yielded.

Example 3

Synthesis of the acetal (formal) protected branching chain extender 5-methyl-1,3-dioxane-5-carboxylic acid from formaldehyde and 2,2-bis(hydroxymethyl)propanoic acid.

400 g of 2,2-bis(hydroxymethyl)propanoic acid, 243.2 g of formaldehyde (37% by weight), 18 g of p-toluenesulphonic acid as catalyst and 3000 ml of benzene were charged in an autoclave provided with a reflux condenser and a thermometer. The reaction mixture was refluxed at 100° C. until 209 g of reaction water was collected. The reaction mixture was now cooled and 381 g of 5-methyl-1,3-dioxane-5-carboxylic acid was recovered.

Example 4

Synthesis of the initiator molecule O,O',O",O'''-tetrakis-(3-hydroxypropyl)-pentaerythritol from pentaerythritol and 3-(benzyloxy)propyl p-toluenesulphonate.

80 g pentaerythritol was at 30° C. dissolved in 3900 ml dimethylformamide followed by addition of 154 g of sodium hydride solution (60% in mineral oil). The mixture was stirred and heated to 35° C. 1120 g of 3-(benzyloxy)propyl p-toluenesulphonate dissolved in 1200 ml of dimethylformamide was added after 30 minutes. The mixture was briefly heated to 40° C. and then left at room temperature until completed reaction. 120 ml water in 1200 ml dimethylformamide was now added. Solvents were removed and the residue was partitioned in diethyl ether and water. The organic phase was washed with water followed by addition of silica gel and removal of solvent. Recovery and purification yielded 260 g of the tetra(benzyloxypropyl) ether of pentaerythritol. The tetra(benzyloxypropyl) ether was hydrogenolysed over 60 g of Pd(C), 10% Pd, in ethanol. The reaction mixture was after completed hydrogenolysis filtered followed by removal of solvent. Obtained product was dried in vacuum (0.5 mm Hg) to yield 131 g of the tetra(hydroxypropyl) ether of pentaerythritol—O,O',O'',O'''-tetrakis-(3-hydroxypropyl)pentaerythritol—in the form of a viscous oil.

Example 5

Synthesis of the initiator molecule allyl 2,2-bis(hydroxymethyl)propanoate from 2,2-bis(hydroxymethyl)propanoic acid and allyl bromide.

286 g of 2,2-bis(hydroxymethyl)propanoic acid, 215 ml of allyl bromide and 314 g of potassium carbonate was mixed in 3600 ml of dimethylformamide and stirred for 16 hours at 45° C. 3600 ml of toluene was after cooling to room temperature added and the mixture was filtered followed by removal of solvents. The allyl ester of 2,2-bis(hydroxymethyl)propanoic acid—allyl 2,2-bis(hydroxymethyl)propanoate—was recovered in a yield of >90%.

Example 6

Synthesis of a first generation dendritic polyalcohol from pentaerythritol and the acetal protected branching chain extender obtained according to Example 1.

a) 12.6 g of Pentaerythritol, 148.3 g of an acetal protected branching chain extender obtained according to Example 1 and 5.1 g of 4-(dimethylamino)pyridine were suspended/dissolved in 1200 ml of dichloromethane followed by addition of 128.3 g of dicyclohexylcarbodiimide dissolved in 250 ml of dichloromethane. The reaction mixture was stirred at room temperature until completed reaction and filtered. The filtrate was stirred with 830 ml of aqueous sodium hydrogen carbonate (0.8M) and allowed to separate. The aqueous and the dichloromethane phases were then separated. The dichloromethane phase was washed with water, aqueous tartaric acid and water. The solvent was removed and the residue was recrystallized from ethyl acetate. The crude product was in subsequent steps purified by precipitation from ethanol yielding 68.6 g of a first generation acetal terminated dendrimer.

(b) The first generation acetal terminated dendrimer was suspended in 830 ml of 1,2-(dimethoxy)ethane and 840 ml of methanol and hydrogenolysed over 10 g of Pd(C), 5% Pd, as catalyst to yield a first generation polyalcohol and toluene. The reaction mixture was, after hydrogenolysis, filtered and 1,2-(dimethoxy)ethane, methanol and toluene were removed. Obtained solid was purified to yield 43.3 g of a first generation dendritic polyalcohol having 8 hydroxyl groups. Yield ≈83%.

Example 7

Synthesis of a second generation dendritic polyalcohol from the first generation dendritic polyalcohol according to Example 6 and the acetal protected branching chain extender according to Example 1.

a) 37.1 g of dendritic polyol obtained according to Example 6, 220 g of an acetal protected branching chain extender obtained according to Example 1 and 71.4 g of 4-(dimethylamino)pyridine were dissolved/suspended in 2200 ml of dichloromethane followed by addition of 192.1 g of dicyclohexylcarbodiimide dissolved in 360 ml of dichloromethane. The reaction mixture was stirred at room temperature until completed reaction and filtered. The filtrate was stirred with 1800 ml of a sodium hydrogen carbonate solution (0.60M) and the dichloromethane phase was extracted with water, aqueous tartaric acid and water. The solvent was removed and the crude product was recrystallized from first ethyl acetate and then ethanol. The filtrate was evaporated and the residue was dissolved in refluxing ethanol. The ethanol solution was cooled to 20° C. and decanted and the residue was dried in vacuum to yield 126.4 g of a second generation acetal terminated dendrimer. A second precipitation from ethanol yielded 115.7 g of a second generation acetal terminated dendrimer in form of an amorphous solid.

b) The second generation acetal terminated dendrimer was suspended in 1100 ml of ethyl acetate and 1100 ml of methanol and hydrogenolysed over 36 g of Pd(C), 5% Pd, as catalyst to yield a second generation polyalcohol and toluene. The reaction mixture was, after hydrogenolysis, filtered and ethyl acetate, methanol and toluene were removed. Obtained solid was purified to yield 71.4 g of a second generation dendritic polyalcohol having 16 hydroxyl groups. Yield ≈90%.

Example 8

Synthesis of a third generation dendritic polyalcohol from the second generation dendritic polyalcohol according to Example 7 and the acetal protected branching chain extender according to Example 1.

a) 71.5 g of a dendritic polyol obtained according to Example 6, 333.1 g of an acetal protected branching chain extender obtained according to Example 1 and 12 g of 4-(dimethylamino)pyridine were dissolved/suspended in 3800 ml of dichloromethane and an addition of 3800 ml of 1,2-(dimethyloxy)ethane was followed by addition of 289 g of dicyclohexylcarbodiimide dissolved in 750 ml of dichloromethane. The reaction was allowed to continue at room temperature until completed, after which 100 ml of ethanol was added and the reaction mixture was filtered. Solvents were removed and the residue was refluxed with 20 l of ethanol. The solution was after cooling to room temperature decanted and the residue was washed with ethanol and dried at 0.5 mm Hg to yield 223.8 g of a third generation acetal terminated dendrimer.

b) The third generation acetal terminated dendrimer was dissolved in 2000 ml of ethyl acetate and 2000 ml of methanol and hydrogenolysed over 40 g of Pd(C), 5% Pd, as catalyst to yield a third generation polyalcohol and toluene. The reaction mixture was, after hydrogenolysis, filtered and ethyl acetate, methanol and toluene were removed yielding, in form of a viscous oil, 139.2 g of a third generation dendritic polyalcohol having 32 hydroxyl groups. Yield ≈88%.

Example 9

Synthesis of a fourth generation dendritic polyalcohol from the third generation dendritic polyalcohol according to Example 8 and the acetal protected branching chain extender according to Example 1.

a) 89.4 g of a dendritic polyol obtained according to Example 7, 375 g of an acetal protected branching chain extender obtained according to Example 1 and 15 g of 4-(dimethylamino)pyridine were dissolved/suspended in 3100 ml of dichloromethane and 3100 1,2-(dimethylexy)ethane followed by addition of 325 g of dicyclohexylcarbodiimide dissolved in 650 ml of dichloromethane. The reaction was after a further addition of 163 g of dicyclohexylcarbodiimide allowed to continue at room temperature until completed, after which 150 ml of ethanol was added and the reaction mixture was filtered. Solvents were removed and the residue was refluxed with 15 l of ethanol. The solution was after cooling to room temperature diluted with 6000 ml of ethyl acetate to give a homogeneous solution and decanted. The residue was washed with ethanol and dried at 0.5 mm Hg to yield 219.4 g of a fourth generation acetal terminated dendrimer.

b) The fourth generation acetal terminated dendrimer was dissolved in 3100 ml of 1,2-(dimethyloxy)ethane and 3100 ml of methanol and hydrogenolysed over 32 g Pd(C), 5% Pd, as catalyst to yield a fourth generation polyalcohol and toluene. The reaction mixture was, after hydrogenolysis, filtered and 1,2-(dimethyloxy)ethane, methanol and toluene were removed yielding, in form of a viscous oil, 140.6 g of a fourth generation dendritic polyalcohol having 64 hydroxyl groups. Yield >98%.

Example 10

Synthesis of a first generation dendritic polyalcohol from O,O',O",O'''-tetrakis-(3-hydroxypropyl)pentaerythritol obtained according to Example 4 and an acetal protected branching chain extender obtained according to Example 1.

Example 6 was repeated with the difference that said O,O',O",O'''-tetrakis-(3-hydroxypropyl)pentaerythritol was, at the same molar ratio, employed instead of pentaerythritol. Yielded first generation dendritic polyalcohol had 8 hydroxyl groups.

Example 11

Synthesis of a second generation dendritic polyalcohol from a first generation dendritic polyalcohol obtained according to Example 10 and an acetal protected branching chain extender obtained according to Example 1.

Example 7 was repeated with the difference that a first generation dendritic polyalcohol obtained according to Example 10 was, at the same molar ratio, employed instead of a first generation dendritic polyalcohol according to Example 6. Yielded second generation dendritic polyalcohol had 16 hydroxyl groups.

Example 12

Synthesis of a third generation dendritic polyalcohol from a second generation dendritic polyalcohol obtained according to Example 11 and an acetal protected branching chain extender obtained according to Example 1.

Example 8 was repeated with the difference that a second generation dendritic polyalcohol obtained according to Example 11 was, at the same molar ratio, employed instead of a second generation dendritic polyalcohol obtained according to Example 7. Yielded third generation dendritic polyalcohol had 32 hydroxyl groups.

Example 13

Synthesis of a fourth generation dendritic polyalcohol from a third generation dendritic polyalcohol obtained according to Example 12 and an acetal protected branching chain extender obtained according to Example 1.

Example 9 was repeated with the difference that a third generation dendritic polyalcohol obtained according to Example 12 was, at the same molar ratio, employed instead of a third generation dendritic polyalcohol according to Example 8. Yielded fourth generation dendritic polyalcohol had 64 hydroxyl groups.

Example 14

Synthesis of a first generation dendritic polyalcohol from pentaerythritol and an acetal protected branching chain extender obtained according to Example 2.

Example 6 was repeated with the difference that an acetal protected branching chain extender according to Example 2 was, at the same molar ratio, employed instead of an acetal protected branching chain extender obtained according to Example 1. The hydrogenolysis accordingly yielded substantially the same dendritic polyalcohol having 8 hydroxyl groups as yielded in Example 6, but p-methoxytoluene instead of toluene.

Example 15

Synthesis of a first generation dendritic polyalcohol from allyl 2,2-bis(hydroxymethyl)propanoate obtained according to Example 5 and an acetal protected branching chain extender obtained according to Example 1.

Example 6 was repeated with the difference that said allyl 2,2-bis(hydroxymethyl)propanoate was employed instead of pentaerythritol. The molar ratio was adjusted to the number of available hydroxyl groups. Yielded polyalcohol had 4 hydroxyl groups and can be used for further dendritic branching in accordance with for instance Examples 7, 8 and 9. The protected carboxyl group can be deprotected, yielding a monocarboxyfunctional dendritic polyalcohol, by for instance methods disclosed in *"Protective Groups in Organic Synthesis"* by Theodora W. Greene and Peter G. M. Wuts, Chapter 5, "Protection for the Carboxyl Group—Esters"—John Wiley & Sons Inc., New York 1991.

Example 16

Synthesis of a first generation dendritic polyalcohol from trimethylolpropane and an acetal (formal) protected branching chain extender obtained according to Example 3.

Example 6 Step (a) was repeated with the difference that trimethylolpropane was employed instead of pentaerythritol and that an acetal protected branching chain extender according to Example 3 was employed instead of an acetal protected branching chain extender according to Example 1. The molar ratio was accordingly adjusted to the number of available hydroxyl goups. Yielded first generation dendritic acetal terminated/protected polymer can be deprotected yielding a first generation dendritic polyalcohol having 6 hydroxyl groups, which polyalcohol can be further branched in accordance with for instance Step (a) of Examples 7, 8 and 9. Suitable protection and deprotection methods are disclosed in for instance *"Protective Groups in Organic Synthesis"* by Theodora W. Greene and Peter G. M. Wuts, Chapter 2, "Protection for the Hydroxyl Group—Cyclic Acetals and Ketals"—John Wiley & Sons Inc., New York 1991.

What is claimed is:

1. A process for synthesis of a dendritic polymeric polyalcohol having reactive or protected terminal hydroxyl groups, which polymeric polyalcohol has n dendritic branches emanating from a monomeric or polymeric initiator molecule having n reactive groups (A), whereby each branch comprises g branching generations each generation comprising at least one polymeric or monomeric branching chain extender having three functional groups of which at least two are reactive hydroxyl groups (B) and one is a group (C) reactive to said reactive group (A) and/or said hydroxyl groups (B), and optionally at least one spacing generation, comprising at least one spacing chain extender having two functional groups of which one is a protected hydroxyl group (B") and one is a group (D) reactive to a hydroxyl group, and whereby n and g are integers and at least 1, said process comprising the steps of (i) acetal protection of the two hydroxyl groups (B) of employed monomeric or polymeric branching chain extender, said acetal protection being obtained by reaction between said two hydroxyl groups (B) and an acetalforming carbonyl compound;

(ii) addition to the initiator molecule of a first branching generation by reaction between said reactive group (A) and said reactive group (C) at a molar ratio reactive groups (A) to reactive groups (C) of 1 to at least 1, whereby a polymeric polyalcohol having acetal protected hydroxyl groups (B') and n dendritic branches comprising one generation is yielded, which acetal protected hydroxyl groups (B') optionally are deprotected by means of acetal decomposition, whereby a polymeric polyalcohol having reactive hydroxyl groups (B) is yielded;

(iii) addition of further branching generations, in g-1 repeated steps, by reaction between reactive hydroxyl groups (B), obtained after deprotection by means of acetal decomposition, and reactive group (C) at a molar ratio hydroxyl groups (B) to reactive groups (C) of 1 to at least 1, whereby a polymeric polyalcohol having acetal protected hydroxyl groups (B') and n dendritic branches comprising two or more generations is yielded, which acetal protected hydroxyl groups (B') optionally is deprotected by means of acetal decomposition, whereby a polymeric polyalcohol having reactive hydroxyl groups (B) is yielded;

and wherein step (ii) and/or each repetition of Step (iii) optionally and individually is followed by a) a partial protection of available reactive hydroxyl groups (B), whereby a polymeric polyalcohol having at least one reactive hydroxyl group (B) for utilization in Step (iii) or a repeated Step (iii) is yielded; and/or b) addition of said optional spacing chain extender yielding, after deprotection of said protected hydroxyl group (B"), a polymeric polyalcohol having reactive hydroxyl groups (B) for utilization in Step (iii) or a repeated Step (iii) and n dendritic branches comprising one or more branching generations and at least one spacing generation being at least a partial generation.

2. A process according to claim 1 wherein partial protection of available hydroxyl groups (B) is acetal, ketal or ester protected.

3. A process according to claim 1 wherein n is an integer between 1 and 20.

4. A process according to claim 1 wherein n is an integer between 2 and 12.

5. A process according to claim 1 wherein n is an integer between 2 and 8.

6. A process according to claim 1 wherein g is an integer between 1 and 50.

7. A process according to claim 1 wherein g is an integer between 2 and 20.

8. A process according to claim 1 wherein g is an integer between 2 and 8.

9. A process according to claim 1 wherein said dendritic polymeric alcohol is built up from polyester units, optionally in combination with ether, polyether, amide and/or polyamide units.

10. A process according to claim 1 wherein said dendritic polymeric polyalcohol has two or more identical and/or symmetrical dendritic branches and wherein continued branching chain extension yields a dendritic polymeric polyalcohol having increased branching density and increased number of reactive hydroxyl groups (B) and/or acetal protected hydroxyl groups (B').

11. A process according to claim 1 wherein said reactive group (A) is hydroxyl, an epoxide, a carboxyl or an anhydride group.

12. A process according to claim 1 wherein said reactive group (C) and said reactive group (D) are the same or difference and are epoxide, carboxyl or anhydride groups.

13. A process according to claim 1 wherein said reactive group (A) is a hydroxyl group and said reactive group (C) and said reactive group (D) are carboxyl groups.

14. A process according to claim 1 wherein each addition of a branching generation individually employs an acetal protected branching chain extender being a reaction product between the same or a difference branching chain extender and/or the same or a difference acetalforming carbonyl compound.

15. A process according to claim 1 wherein said acetal protected branching chain extender is prefabricated.

16. A process according to claim 1 wherein said acetal protected branching chain extender is yielded during synthesis or receovery of a synthesized polyalcohol or hydroxyfunctional carboxylic acid.

17. A process according to claim 1 wherein said acetal protected branching chain extender is synthesized in a separate process.

18. A process according to claim 1 wherein addition of branching and optional spacing generations is performed at a temperature of −30–150° C.

19. A process according to claim 1 wherein addition of branching and optional spacing generations is performed at a temperature of −10–80° C.

20. A process according to claim 1 wherein addition of branching and optional spacing generations is performed at a temperature of 10–50° C.

21. A process according to claim 1 wherein said acetal forming carbonyl compound is an aldehyde.

22. A process according to claim 21 wherein said aldehyde is an aldehyde of formula

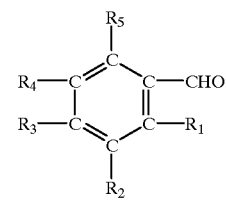

wherein $R_1$, $R_2$, $R_3$, $R_4$ $R_5$ independently is hydrogen, alkyl, alkoxy, halo, haloalkyl or haloalkoxy.

23. A process according to claim 21 wherein said aldehyde is benzaldehyde or a substituted benzaldehyde selected from the group consisting of a) an alkylbenzaldehyde, b) an alkoxybenzaldehyde, c) a halobenzaldehyde,
d) a haloalkylbenzaldehyde, and
e) a haloalkoxybenzaldehyde.

24. A process according to claim 21 wherein deprotection of the acetal protected hydroxyl groups (B') is performed by hydrogenolytic decomposition of the acetal.

25. A process according to claim 24 wherein said hydrogenolytic decomposition is performed in the presence of a solvent selected from the group consisting of water, methanol, ethanol, propanol, glycol, toluene, dimethoxyethane, diethyl ether, dipropyl ether, ethoxyethanol and acetonitrile.

26. A process according to claim 24 wherein said hydrogenolytic decomposition is performed in the presence of a catalyst.

27. A process according to claim 26 wherein said catalyst comprises rhodium, ruthenium, platinum, palladium or an oxide thereof.

28. A process according to claim 21 wherein said aldehyde is formaldehyde, acetaldehyde, butyraldehyde or isobutyraldehyde.

29. A process according to claim 28 wherein deprotection of the acetal protected hydroxyl groups (B') is performed by hydrolytic decomposition of the acetal under acidic conditions.

30. A process according to claim 28 wherein deprotection of the acetal protected hydroxyl groups (B') is performed by a combined hydrolytic and hydrogenolytic decomposition of the acetal under said conditions.

31. A process according to claim 1 wherein said branching chain extender is a dihydroxyfunctional monocarboxylic acid or an adduct between dihydroxyfunctional monocarboxylic acid and at least one alkylene oxide, which adduct has two hydroxyl groups and one carboxyl group.

32. A process according to claim 31 wherein said alkylene oxide is ethylene oxide, propylene oxide, butylene oxide, phenylethylene oxide or a mixture thereof.

33. A process according to claim 1 wherein said branching extender is 2,2-bis(hydroxymethyl)propanoic acid, 2,2-bis(hydroxymethyl) butanoic acid, 2,2-bis(hydroxymethyl)pentanoic acid or 2,3-dihydroxypropanoic acid.

34. A process according to claim 31 wherein said branching chain extender is activated for acylation as anhydride, as acid chloride, as mixed anhydride or as imidazolide.

35. A process according to claim 34 wherein said acylation is performed in the presence of a solvent or solvent combination selected from the group consisting of methylene chloride, ethylene chloride, chloroform, pyridine, toluene, dimethoxyethane, diethyl ether, dipropyl ether, ethoxyethanol, nitrobenzene, chlorobenzene and acetonitrile.

36. A process according to claim 1 wherein said initiator molecule is an aliphatic, a cycloaliphatic or an aromatic mono, di, tri or polyalcohol or an adduct thereof.

37. A process according to claim 36 wherein said initiator molecule is a hydroxysubstituted allyl ether, an alkoxylate or an acetal of an aliphatic, a cycloaliphatic or an aromatic mono, di, tri or polyalcohol.

38. A process according to claim 36 wherein said initiator molecule is an alkoxylate obtained by reacting glycerol, trimethylolethane, trimethylolpropane or pentaerythritol with at least one alkylene oxide.

39. A process according to claim 38 wherein said alkylene oxide is ethylene oxide, propylene oxide, butylene oxide, phenylethylene oxide or a mixture thereof.

40. A process according to claim 36 wherein said initiator molecule is a hydroxysubstituted allyl ether.

41. A process according to claim 40 wherein said hydroxysubstituted allyl ether is glycerol monoallyl ether, glycerol diallyl ether, trimethylolpropane monoallyl ether, trimethylolpropane diallyl ether, pentaerythritol monoallyl ether, pentaerythritol diallyl ether or pentaerythritol triallyl ether.

42. A process according to claim 36 wherein said initiator molecule is ethylene glycol, diethylene glycol, triethylene glycol, polyethylene glycol, propylene glycol, dipropylene glycol, tripropylene glycol, polypropylene glycol, neopentyl glycol, dimethylolpropane, glycerol, trimethylolethane, trimethylolpropane, pentaerythritol, ditrimethylolethane, ditrimethylolpropane, anhydroennea-hepitol, dipentaerythritol, sorbitol, mannitol, trimethylolpropane triethoxylate, trimethylolpropane tripropoxylate, pentaerythritol triethoxylate, pentaerythritol pentaethoxylate of O,O',O'',O'''-tetrakis-(3-hydroxypropyl)-pentaerythritol.

43. A process according to claim 1 wherein the initiator molecule is an acetal.

44. A process according to claim 43 wherein said acetal is a 1,3-dioxane or a 1,3-dioxolane alcohol.

45. A process according to claim 44 wherein said the 1,3-dioxane or 1,3-dioxolane alcohol is 4-hydroxymethyl-1,3-dioxolane, 5-methyl-5-hydroxymethyl-1,3-dioxane, 5-ethyl-5-hydroxymethyl-1,3-dioxane or 5,5-dihydroxymethyl-1,3-dioxane.

46. A process according to claim 43 wherein said acetal after completed addition of branching and optional spacing chain extenders is decomposed yielding reactive hydroxyl groups.

47. A process according to claim 1 wherein said initiator molecule is a hydroxyfunctional carboxylic acid or an adduct thereof, said initiator molecule having at least one reactive group (A) being a hydroxyl group and at least one, optionally protected, carboxyl group.

48. A process according to claim 47 wherein said adduct is an alkoxylate obtained by reacting a hydroxyfunctional carboxylic acid and an alkylene oxide.

49. A process according to claim 48 wherein said alkylene oxide is ethylene oxide, propylene oxide, butylene oxide, phenylethylene oxide or a mixture thereof.

50. A process according to claim 47 wherein said hydroxyfunctional carboxylic acid is 2,2-bis(hydroxymethyl)propanoic acid, 2,2-bis(hydroxymethyl) butanoic acid, 2,2-bis(hydroxymethyl)pentanoic acid, 2,3-dihydroxypropanoic acid, hydroxypentanoic acid, hydroxypropanoic acid or 2,2-dimethyl-3-hydroxypropanoic acid.

51. A process according to claim 47 wherein said optionally protected carboxyl group after completed addition of branching and optional spacing generations, before, during or after deprotection of hydroxyl groups, is deprotected yielding a monocarboxyfunctional dendritic polyalcohol or dendritic acetal protected polyalcohol.

52. A process according to claim 51 wherein at least one monocarboxyfunctional dendritic polyalcohol or dendritic acetal protected polyalcohol is added, by reaction between its carboxyl groups and a reactive group (A) of an initiator molecule, said reactive group (A) being a hydroxyl or an epoxide group.

53. A process according to claim 1 wherein said initiator molecule is a phenolic alcohol.

54. A process according to claim 53 wherein said phenolic alcohol is a xylylene alcohol or a hydroxyphenylalkane.

55. A process according to claim 1 wherein said initiator molecule is a glycidyl ether or glycidyl ester.

56. A process according to claim 1 wherein said optional addition of a spacing chain extender employs a monohydroxyfunctional monocarboxylic acid, its hydroxyl group (B") being benzyl, silyl or pyranyl protected.

57. A process according to claim 56 wherein said protected hydroxyl group (B") is p-methoxybenzyl, tert.butyldimethylsilyl or tetrahydropyranyl protected.

58. A process according to claim 56 wherein said monohydroxyfunctional monocarboxylic acid is hydroxypentanoic acid, hydroxypropanoic acid or 2,2-dimethyl-3-hydroxypropanoic acid.

59. A process according to claim 56 wherein said protected hydroxyl group (B") is deprotected after addition of the spacing chain extender, whereby a reactive hydroxyl group (B) is yielded.

60. A process according to claim 1 wherein said initiator molecule is a hydroxysubstituted allyl ether, said initiator molecule having at least one reactive group (A) being a hydroxyl group and at least one, optionally protected, carboxyl group.

61. A process according to claim 1 wherein said initiator molecule is an alkyl, aryl or alkaryl ester of a hydroxyfunctional carboxylic acid or an adduct thereof, protected carboxyl groups being ester protected.

62. A process according to claim 61 wherein said ester is an allyl or a benzyl ester.

\* \* \* \* \*